June 8, 1943.  B. WATHEN  2,320,988
SHAKER CONVEYER
Filed Nov. 13, 1939  2 Sheets-Sheet 1

INVENTOR
BEN WATHEN
BY
Philip A. Minnis
ATTORNEY

June 8, 1943.  B. WATHEN  2,320,988
SHAKER CONVEYER
Filed Nov. 13, 1939    2 Sheets-Sheet 2
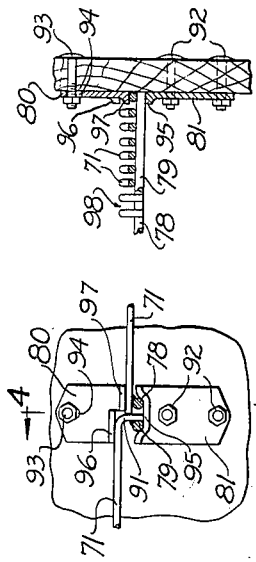
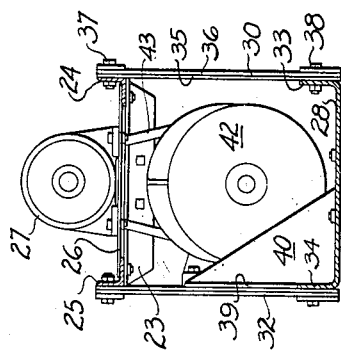
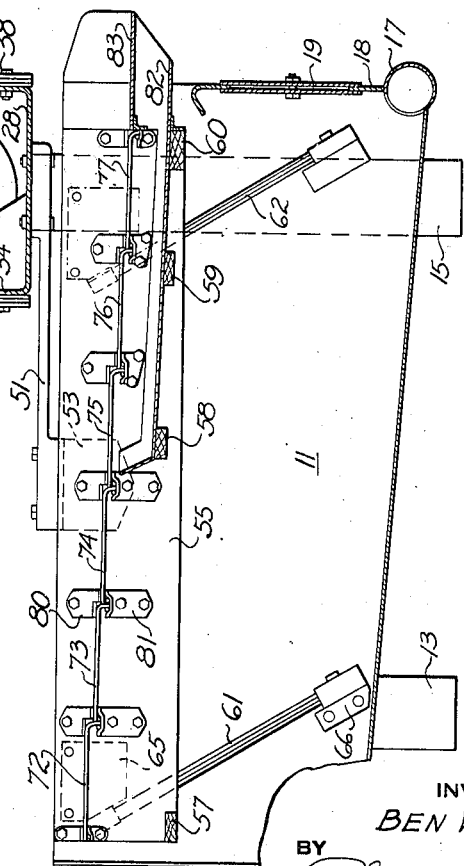
INVENTOR
*BEN WATHEN*
BY
*Philip A. Minnis*
ATTORNEY Patented June 8, 1943

2,320,988

UNITED STATES PATENT OFFICE 2,320,988

SHAKER CONVEYER

Ben Wathen, San Jose, Calif., assignor to Food Machinery Corporation, San Jose, Calif., a corporation of Delaware Application November 13, 1939, Serial No. 304,030

15 Claims. (Cl. 209—395)

This invention relates to shaker conveyers or shaker tables and especially to their use in the food preparation industry.

Shaker tables have a variety of uses such as: to turn the product over and over for purposes of inspection; to cause the product to assume a certain position, as peach halves on their cut faces; to carry out an operation, as pricking prunes; to remove dirt and waste from the product; or to grade the products according to size. What function is performed by the machine depends largely on the construction of the table itself, and it is with this construction that my invention is concerned.

One of the objects of my invention is to provide a shaker table construction that is particularly suited to handling diced food products. The desired result in a shaker table is to cause the products to tumble over and over. This is difficult to achieve with diced food products for two reasons: the product is sticky and gummy from the juices oozing out from its cut faces and, instead of tumbling, it tends to slide along on one face; also, the product being cubical tends by reason of its shape to resist turning over.

Another object of my invention is to provide a removable-unit construction which facilitates cleaning and replacement.

Still another object is to provide a construction in which the parts which come into contact with the food product can be made of metal, such as stainless steel, not only for long life but for sanitary reasons as well.

While for purposes of disclosure the invention is shown a embodied in a machine for handling diced food products it will become apparent that it has many desirable features which could be employed to advantage in other uses.

In the drawings:

Fig. 2 is a vertical longitudinal section thereof.

Figs. 3 and 4 are an elevation and section respectively showing details of the grill and the brackets for mounting it.

Figs. 5 and 6 are corresponding views of a modified construction.

Figure 1:
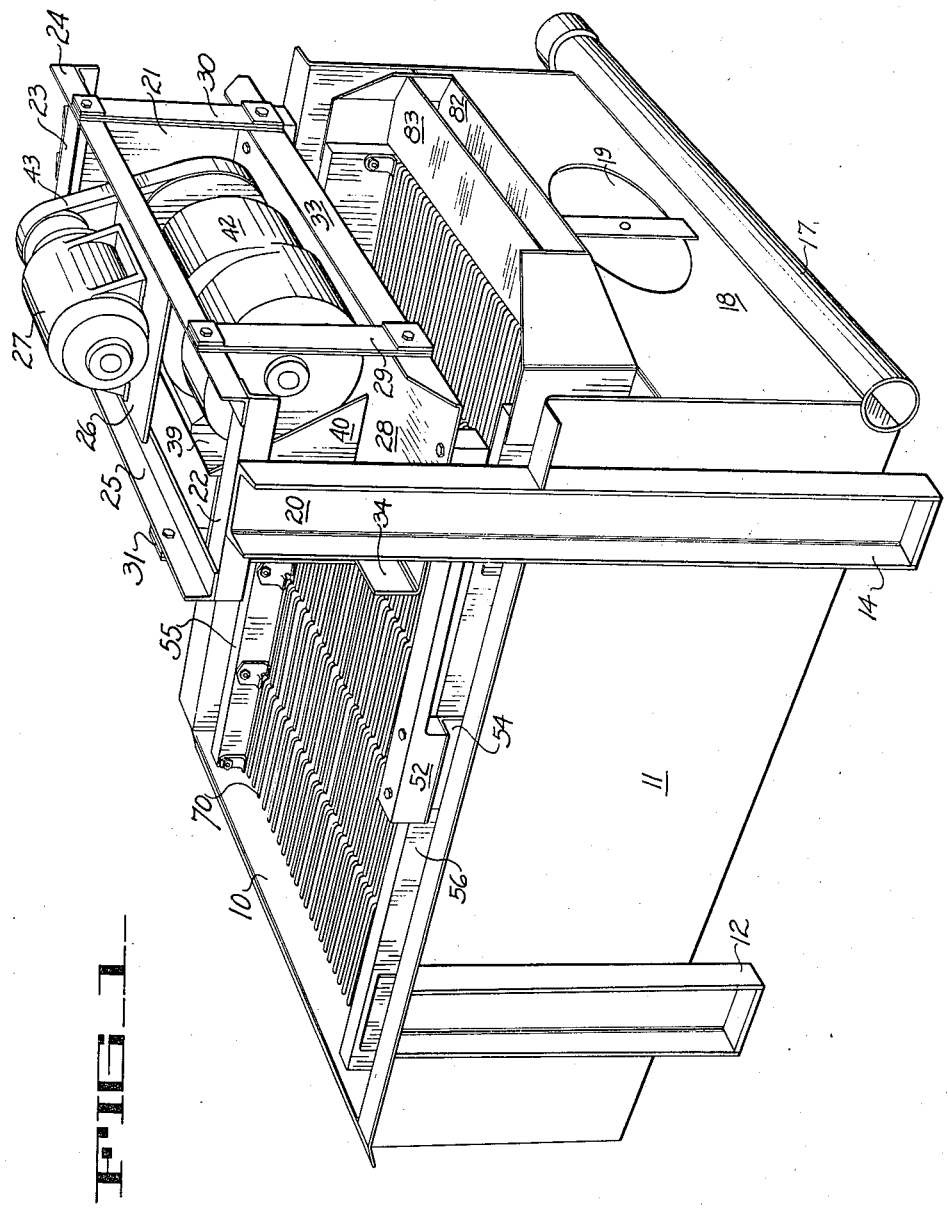
Fig. 1 is a perspective view of a machine embodying the invention.

The frame 10 of the machine is constructed of steel. It comprises a sheet metal bin or tank 11 supported on rear legs 12, 13 and front legs 14, 15. The bottom of the tank (Fig. 2) slopes downwardly toward the front of the machine where there is a fluid drain pipe 17. The front wall 18 of the tank has a covered hand hole 19 through which material collected in the tank can be removed.

The front legs 14, 15 extend above the tank as posts 20, 21 to support a superstructure comprising two longitudinal angles 22, 23 secured to the posts and two transverse angles 24, 25 secured to the longitudinal angles. A plate 26 is secured to the transverse angles 24, 25 to provide a rigid platform on which to mount the motor 27.

A shaking device 42 of the rotary unbalanced weight type is supported in a swing hung from the superstructure. This swing comprises a sub-frame 28 which is supported by four laminated wood straps 29, 30, 31, 32. The upper ends of the front straps 29, 30 (Fig. 1) are secured to angle 24 and the lower ends to a vertical flange 33 of a steel plate which forms the floor of the sub-frame and which has a vertical flange 34 at its rear edge to which the lower ends of strips 31, 32 are secured, their upper ends being secured to angle 25. The four straps are substantially identical, each being composed of two strips of wood such as 35, 36 (Fig. 2) secured by bolts 37, 38 to angle 24 and flange 33. The rear flange 34 has a vertically-extended portion 39 which is braced by triangular plates, such as 40, welded thereto and to the floor of the sub-frame. The mechanical shaking device 42, which is of known construction, will not be disclosed in detail herein, as its construction is not part of this invention. The shaking device 42 is rigidly mounted on the vertical portion 39 of the sub-frame and is driven by a belt 43 from the motor 27.

When the motor rotates the shaking device, the unbalanced weight action causes a rapid oscillation of the device as a unit and, the unit being rigidly mounted on the sub-frame 28, the latter is caused to oscillate with respect to the superstructure from which it is suspended on the flexible straps 29, 30, 31, 32.

Two wooden links 51, 52 have their forward ends rigidly bolted to the floor of the sub-frame 28. Their rear ends are bolted to angle plates 53, 54 which are secured to the wooden sides 55, 56 of the shaker table. Transverse pieces 57, 58, 59, 60 (Fig. 2) have their ends secured to the sides 55, 56 and comprise therewith the framework of the table.

The shaker table is supported for oscillation on four flexible arms. Arm 61 (Fig. 2) has its upper end secured to a bracket 65 which is secured to the side 55 of the table. Its lower end is secured to a bracket 66 which is secured to the wall of the tank 11. The other arms are similarly connected, arms 61 and 62 (Fig. 2) supporting one side of the table and two other arms not shown are provided for supporting the other side of the table. The arms are arranged in parallel and inclined to the vertical. Each is composed of strips of wood so that it may flex. The resultant movement of which the table is capable is an oscillatory one.

The movement begins at the position shown in Fig. 2. When the table oscillates it rises and moves forward, then it moves backward and lowers to the starting position. It will be understood that this particular movement is inherent in the manner in which the table is mounted on the four inclined flexible arms. The table is actuated, however, by the two links 51, 52 from the sub-frame 23 on which the shaking device is mounted.

The framework of the shaker table supports the step-down grill 70 (Fig. 1) on which the food products to be handled are placed. It comprises sections or steps of spaced-apart parallel rods 71 which are turned down at their forward ends at 91 (Fig. 3) to form a step. There is a flight of these grill steps, 72, 73, 74, 75, 76, 77 (Fig. 2).

Each section or step is a separate and removable unit. The rods 71 of each step are secured in their spaced-apart parallel relation by welding to transverse rods 78, 79 (Figs. 3 and 4). The steps are held firmly in place in the table framework by means of special brackets, such as 80, 81 (Fig. 2) which are mounted on the sides of the table. As shown in Figs. 3 and 4, the lower bracket 81 is secured by means of bolts 92. The upper bracket 80 is fastened by a bolt 93 which passes through a slot 94 in the bracket to permit vertical adjustment. The lower bracket 81 has a flanged depression 95 in its upper edge to receive the ends of transverse rods 78, 79. The upper bracket 80 has two flanges 96, 97 which engage the rods 71 of two adacent steps. It will be noted in Fig. 2 that there are a series of these brackets along the side 55 of the table. A similar series of these same brackets (not shown) is provided on the other side 56.

In assembling, the steps are individually laid in place by engaging the ends of the transverse rods 78, 79 in the depressions 95 and then the upper brackets 80 are clamped on with their flanges 96, 97 bearing down on the rods 71 so that the rods 78, 79 are held firmly in place in the depressions 85. Any selected one of the steps may be removed for cleaning or replacement without disturbing the other steps by removing the two brackets 80 on each side whose flanges overlie the step in question. The step can then be lifted out of the table.

The spacing between the rods 71 determines the sizing. In some uses, such as removing undesirable slivers and shreds from diced products, the same spacing is maintained from one end of the table to the other.

When used for grading, or for cleaning and then grading, the spacing of the rods in different steps is varied. By way of illustration, in Fig. 2 the spacing of the rods in the first three steps 72, 73, 74, is less than the spacing of the rods in the last three steps 75, 76, 77. Pieces which are small enough to pass between the rods in the first three steps fall down into the tank. Those which separate out in the last three steps fall on an inclined floor 82 and are discharged over the front edge thereof. The largest pieces are discharged onto the plate 83 from which they are removed from the machine.

The purpose of the step-down construction is to insure tumbling of cubes which might tend to slide along the rods. Particularly sticky cubes may slide along the trough or channel 98 (Fig. 4) formed by two of the parallel rods 71 without turning over. When such a cube arrives at 91 (Fig. 3) it emerges from the open end of the trough 98 and tumbles down onto the next lower step. In this way it gets a fresh start at the beginning of each step. The open-end trough construction prevents clogging of the grill in that the material is able to work its way out through the open end.

A modified construction of the brackets for holding the steps in place in the table is shown in Figs. 5 and 6. The parts correspond in every respect to those shown in Figs. 3 and 4 except that a plate 100 overlies the bracket 80 and the bolt 93 passes through a hole in the plate. A screw 101 is threaded through the flange 102 of the plate 100 and bears against the flange 96 of the bracket 80, which is provided with a pad 103 having an inclined surface on which the end of the screw may bear. The parts are assembled as shown with the bolt 93 not entirely tight so that the bracket 80 may be pressed downward by tightening the screw 101. When the flanges 96, 97 are tightly clamping the steps in place the bolts 93 may then be tightened to lock the steps in the table.

By employing a removable-unit construction the shaker table is very flexible in its use in the cannery because simply by removing certain sections and replacing them with others in which the spacing of the rods is different the function and mode of operation of the machine is changed. For example, if it is desired to use the machine to clean the shreds and splinters out of a batch of carrots which have just been diced the table is fitted with sections in which the spacing between the rods is the same from one end of the table to the other. This is essentially a one-size grading operation. If it is desired to extract an intermediate size, grills with larger openings can be readily substituted in the last steps.

The facility with which a shaker table employing my construction can be cleaned is marked. This is of great importance in the canning industry. The shaker table must be kept clean not only for sanitary reasons but to keep it working efficiently because the material being handled tends to gum up the shaker table and clog the openings. The ease and rapidity with which this shaker table can be cleaned also means reduced operating cost.

In addition, and wholly aside from the ease of assembly and disassembly, the parallel rod construction providing open-ended troughs defining descending steps handles the material, particularly diced food products, with efficiency and thoroughness.

While I have described a particular embodiment of the present invention, it will be obvious that various changes and modifications may be made in the details thereof without departing from the spirit of the present invention and the scope of the appended claims.

Having thus described my invention and in what manner the same may be used, what I claim as new and desire to protect by Letters Patent is:

1. A shaker table comprising a framework; a plurality of sections, means for removably securing said sections to said framework, each of said sections comprising a plurality of spaced apart parallel rods, said rods being turned down at the front edge of the section to form the riser of a step, said sections being disposed in said framework with the rear edge of one section abutting the riser of the adjacent section, whereby upon removal of said securing means any selected section may be lifted out of said framework without removing sections adjacent thereto.

2. A shaker table comprising a framework including two opposite side members, a plurality of sections, each consisting of a plurality of parallel longitudinal rods and transverse rods secured thereto adjacent the front and rear edges of the section, a series of mountings on each of said side members, each of said mountings including a bracket formed to receive adjacent transverse rods.

3. A shaker table comprising a framework including two opposite side members, a plurality of sections, each consisting of a plurality of parallel longitudinal rods and transverse rods secured thereto adjacent the front and rear edges of the section, a series of mountings on each of said side members, each of said mountings including a bracket formed to receive adjacent transverse rods, and a clamp adapted to engage said longitudinal rods.

4. A shaker table comprising a framework including two opposite side members, a plurality of sections, each consisting of a plurality of parallel longitudinal rods and transverse rods secured thereto adjacent the front and rear edges of the section, a series of mountings on each of said side members, each of said mountings being formed to receive adjacent transverse rods, a clamp adapted to engage said longitudinal rods, and a screw to adjust said clamp.

5. A shaker table comprising a framework including two opposite side members, a plurality of sections, each consisting of a plurality of parallel longitudinal rods and transverse rods secured thereto adjacent the front and rear edges of the section, a series of mountings on each of said side members, each of said mountings including a bracket secured to the side member and having a depression to receive the ends of adjacent transverse rods, and a clamp mounted on the side member for vertical adjustment and adapted to engage said longitudinal rods to maintain said transverse rods in said depression.

6. A shaker table comprising a framework including two opposite side members, a plurality of sections, each consisting of a plurality of parallel longitudinal rods and transverse rods secured thereto adjacent the front and rear edges of the sections, a series of mountings on each of said side members, each of said mountings including a bracket secured to the side member and having a depression to receive the ends of adjacent transverse rods, a clamp mounted on the side member for vertical adjustment and adapted to engage said longitudinal rods to maintain said transverse rods in said depression, and a screw to adjust said clamp.

7. A shaker table comprising a framework including two opposite side members, a plurality of step sections, each consisting of a plurality of parallel longitudinal rods with their ends turned down at the front edge of the section to form the riser of the step, and transverse rods secured to said longitudinal rods adjacent the front and rear edges of the section, a series of mountings on each of said side members, each of said mountings including a bracket secured to the side member and having a depression to receive the ends of adjacent transverse rods, and a clamp mounted on the side member for vertical adjustment, said clamp having two flanges, one overlying one section, the other overlying the adjacent section, said clamp serving to maintain said transverse rods in said depression.

8. A shaker table comprising a framework including two opposite side members, a plurality of step sections, each consisting of a plurality of parallel longitudinal rods with their ends turned down at the front edge of the section to form the riser of the step, and transverse rods secured to said longitudinal rods adjacent the front and rear edges of the section, a series of mountings on each of said side members, each of said mountings including a bracket secured to the side member and having a depression to receive the ends of adjacent transverse rods, a clamp mounted on the side member for vertical adjustment, said clamp having two flanges, one overlying one section, the other overlying the adjacent section, said clamp serving to maintain said transverse rods in said depression, and a screw to adjust said clamp.

9. A shaker table comprising a framework, a plurality of individually removable sections, means for securing said sections in said framework, each section having a relatively short upright portion at the forward edge thereof, said sections being disposed in said framework with the rear edge of one section abutting the upright portion of the adjacent section to form a continuous series of steps and there being a plurality of substantially continuous slots extending longitudinally over the surface of the sections and through said upright portions.

10. A shaker table comprising a framework including two opposite side members, a plurality of step sections, each of said sections consisting of a plurality of parallel longitudinal rods with their ends turned down at the front edge of the section to form the riser of the step, and transverse rods secured to said longitudinal rods, means on said side members to provide seats projecting out from said side members on which the ends of said transverse rods are adapted to be lowered to rest, said sections being disposed with the rear edge of one section abutting the riser of the adjacent section when said transverse rods are resting on said seats.

11. A shaker table comprising a framework including two opposite side members, a plurality of material engaging and screening sections having a plurality of transversely spaced screening grooves extending the full length thereof, said sections being arranged side by side in substantial abutment and being individually and separately removable, a plurality of mounting means on said side members upon which to mount said sections, each comprising a supporting bracket fixed to one only of said side members below the section it supports and engaging a marginal side portion only of the sections whereby it does not substantially obstruct the screening grooves, and a retaining member adjustable with respect to said section, to lock said section in position and to clear said section for removing the same from the support in a direction substantially normal thereto, said retaining member being secured to the side member above said section.

12. A shaker table comprising a framework including two opposite side members, a plurality of material engaging sections arranged side by side in substantial abutment and with their adjacent ends substantially even, and a plurality of means for mounting said sections, one of said mounting means being located on each of said side members at each point of adjacency of two of said sections whereby to support a pair of sections, said mounting means comprising a pair of relatively movable brackets, one overlying the sections, and the other underlying the same, said sections having laterally extending members integral therewith adapted to rest upon certain underlying brackets and any selected section being removable from the framework without removing sections adjacent thereto upon moving said overlying brackets in a direction to clear said section.

13. A shaker table comprising a framework including two opposite side members, a plurality of removable, substantially abutting, material engaging sections having their adjacent ends substantially even, a plurality of supporting means fixed with respect to said side members for supporting said sections along laterally extending marginal portions thereof, said supporting means having flanged depressions in which to seat said marginal portions of adjacent sections, the flanges of said depressions extending laterally with respect to said side members to guide said sections in positioning them, and removable retaining means to hold said marginal portions in said depressions, any selected one of said sections being individually and separately removable from said framework without removing sections adjacent thereto upon releasing and clearing said retaining means holding said section.

14. A screen table comprising a framework including two opposite side members, a plurality of material engaging sections positioned to present a series of steps, the individual sections having a plurality of transversely spaced grooves extending the full length thereof and having a short downwardly extending portion at the front edge thereof to form a riser of the step and supporting means fixed relative to said side members to mount said sections, with the riser of one section substantially abutting a marginal portion of an adjacent section, said sections being individually and separately removable, and the longitudinally extending grooves between certain adjacent sections being substantially in line.

15. A screen table comprising a framework including two opposite side members, a plurality of material engaging sections arranged to present a series of steps, the individual sections having a short downwardly extending portion at the front edge thereof to form the riser of a step, and having spaced longitudinal slots extending substantially the full length thereof, supporting means fixed relative to said side members to mount said sections, said supporting means having narrow ledges extending longitudinally of the side members upon which to seat said sections, and means in connection with said side members to secure said sections in position upon said ledges.

BEN WATHEN.